United States Patent [19]

Bergmeister

[11] Patent Number: 5,543,376
[45] Date of Patent: Aug. 6, 1996

[54] PROCESS FOR PRODUCING POLYOLEFINS

[75] Inventor: Joseph J. Bergmeister, Bartlesville, Okla.

[73] Assignee: Phillips Petroleum Company, Bartlesville, Okla.

[21] Appl. No.: 421,096

[22] Filed: Apr. 13, 1995

Related U.S. Application Data

[62] Division of Ser. No. 202,413, Feb. 25, 1994, abandoned.

[51] Int. Cl.$^6$ .......................................... C08F 4/24
[52] U.S. Cl. ..................... 502/117; 502/120; 502/152; 526/119
[58] Field of Search ................... 502/117, 120, 502/152

[56] References Cited

U.S. PATENT DOCUMENTS

| | | | |
|---|---|---|---|
| 3,806,500 | 4/1974 | Karol | 260/94.9 B |
| 3,887,494 | 6/1975 | Dietz | 252/452 |
| 4,364,839 | 12/1982 | McDaniel et al. | 252/430 |
| 4,364,841 | 12/1982 | McDaniel et al. | 252/430 |
| 4,364,842 | 12/1982 | McDaniel et al. | 252/430 |
| 4,364,843 | 12/1982 | Carlson | 252/430 |
| 4,364,854 | 12/1982 | McDaniel et al. | 252/437 |
| 4,364,855 | 12/1982 | McDaniel et al. | 252/437 |
| 4,397,765 | 8/1983 | McDaniel | 252/430 |
| 4,402,864 | 9/1983 | McDaniel | 252/430 |
| 4,405,768 | 9/1983 | McDaniel | 526/96 |
| 4,424,139 | 1/1984 | McDaniel et al. | 502/117 |
| 4,444,962 | 4/1984 | McDaniel et al. | 526/95 |
| 4,444,963 | 4/1984 | McDaniel et al. | 526/100 |
| 4,444,964 | 4/1984 | McDaniel et al. | 526/105 |
| 4,444,965 | 4/1984 | McDaniel et al. | 526/105 |
| 4,444,966 | 4/1984 | McDaniel | 526/106 |
| 4,444,968 | 4/1984 | McDaniel et al. | 526/129 |
| 4,504,638 | 3/1985 | McDaniel et al. | 526/134 |
| 4,530,914 | 7/1985 | Ewen et al. | 502/113 |
| 4,547,479 | 10/1985 | Johnson et al. | 502/155 |
| 4,640,964 | 2/1987 | Johnson et al. | 526/134 |
| 4,659,690 | 4/1987 | McDaniel et al. | 502/439 |
| 4,668,808 | 5/1987 | Smith | 556/12 |
| 4,690,990 | 9/1987 | McDaniel et al. | 526/138 |
| 4,788,171 | 11/1988 | Klendworth | 502/155 |
| 4,803,253 | 2/1989 | McDaniel et al. | 526/352.2 |
| 4,806,513 | 2/1989 | McDaniel et al. | 502/107 |
| 4,900,704 | 2/1990 | McDaniel et al. | 502/210 |
| 4,935,474 | 6/1990 | Ewen et al. | 526/114 |
| 4,939,217 | 7/1990 | Stricklen | 526/114 |
| 4,960,748 | 10/1990 | Klendworth et al. | 502/210 |
| 4,975,403 | 12/1990 | Ewen | 502/113 |
| 5,001,204 | 3/1991 | Klendworth et al. | 526/106 |
| 5,010,152 | 4/1991 | McDaniel et al. | 526/106 |
| 5,032,562 | 7/1991 | Lo et al. | 502/111 |
| 5,032,651 | 7/1991 | McDaniel et al. | 526/96 |
| 5,064,797 | 12/1991 | Stricklen | 502/111 |
| 5,087,789 | 2/1992 | McDaniel et al. | 585/525 |
| 5,104,839 | 4/1992 | McDaniel et al. | 502/113 |
| 5,104,841 | 4/1992 | Conroy et al. | 502/158 |
| 5,110,214 | 5/1992 | Battiste et al. | 374/45 |
| 5,137,997 | 8/1992 | Conroy et al. | 526/126 |
| 5,183,868 | 2/1993 | Nordquest | 526/155 |

*Primary Examiner*—David W. Wu
*Attorney, Agent, or Firm*—Lynda S. Jolly

[57] ABSTRACT

A process is provided to produce polyolefins having a multimodal molecular weight distribution at the molecular level by contacting at least one mono-1-olefin in a polymerization zone, under polymerization conditions, with dual site supported chromium polymerization catalyst systems. Such a polymerization catalyst system comprises an inorganic oxide supported chromium oxide catalyst system and a chromocene compound, wherein the supported catalyst system and chromocene compound are contacted in a polymerization reactor. The resultant, recovered polymer has at least a bimodal, or broad, molecular weight distribution.

14 Claims, No Drawings

PROCESS FOR PRODUCING POLYOLEFINS

This application is a division of application Ser. No. 08/202,413, filed Feb. 25, 1994, now abandoned.

BACKGROUND OF THE INVENTION

This invention relates to a method for preparing polyolefins having a multimodal molecular weight distribution.

Polyolefins having a multimodal molecular weight distribution (MWD), such as polyethylene, can be made into articles by a variety of methods, including, but not limited to, extrusion molding, thermoforming and rotational molding, and have advantages over typical polyolefins lacking a multimodal MWD. Polyolefins having a multimodal MWD process more easily, i.e., they can be processed at a faster throughput rate with lower energy requirements, and at the same time such polymers exhibit reduced melt flow perturbations and are preferred because of improved properties for applications such as blow molding and/or blow molding and/or high strength films. Polymers having a multimodal MWD are generally characterized by having a broad MWD, or more that one MWD peak, as reflected by size exclusion chromatography (SEC) curves.

There are several known methods of producing polyolefins having a multimodal MWD; however, each method has its own disadvantages. Polyolefins having a multimodal MWD can be made by employing two distinct and separate catalyst systems in the same reactor, each producing a polyolefin having a different MWD; however, catalyst feed rates are usually difficult to control and the catalysts can have a detrimental effect on each other. Polymer particles produced from a dual, or even multi-, catalyst system frequently are not uniform in size. Thus, segregation of the polymer during storage and transfer can produce non-homogeneous products.

A polyolefin having a multimodal MWD can also be made by sequential polymerization in two or more separate reactors or blending polymers of different MWD during processing; however, both of these methods increase capital cost and problems discussed earlier regarding polymer segregation can occur.

Multimodal MWD polyethylenes can also be obtained directly from a single reactor polymerization process in the presence of a catalyst system comprising two or more catalytic sites, such as, for example, metallocenes, wherein each site has different propagation and termination rate constants. At certain ratios, and in certain polymerization processes, even catalysts that have different catalytic sites can produce a monomodal, or narrow, MWD polyolefin. Unfortunately, even under ideal conditions, a dual site catalyst system can have decreased catalytic activity. While not wishing to be bound by theory, it is hypothesized that a metallocene can bind to, and therefor inhibit the reactivity of, some of the active chromium oxide catalytic sites. Unfortunately, there are limits to known methods of preparing these very desirable, multimodal, or broad, molecular weight distribution or multimodal molecular weight distribution polyolefins.

SUMMARY OF THE INVENTION

It is an object of the present invention to produce polyolefins having a multimodal, or broadened, molecular weight distribution.

It is a further object of the present invention to provide an improved process of making polyolefins having a multimodal, or broadened, molecular weight distribution.

In accordance with the present invention, polyolefins having a multimodal molecular weight distribution at the molecular level are prepared by contacting at least one mono-1-olefin in a polymerization zone, under polymerization conditions, with dual site supported chromium polymerization catalyst systems. Such a polymerization catalyst system comprises an inorganic oxide supported chromium oxide catalyst system and a chromocene compound, wherein the supported catalyst system and chromocene compound are contacted in a polymerization reactor. In a preferred embodiment, the dual site catalyst system consists essentially of an inorganic oxide supported chromium oxide catalyst system and chromocene. In another embodiment of the invention, the above-described dual site catalyst system can be used to polymerize olefins. The resultant, recovered polymer has at least a bimodal, or broad, molecular weight distribution.

DESCRIPTION OF THE PREFERRED EMBODIMENTS

Catalyst Systems

As used in this disclosure, the term "support" refers to a carrier for another catalytic component. However, by no means, is a support necessarily an inert material; it is possible that a support can contribute to catalytic activity and selectivity.

Any support useful to support chromium catalyst systems can be used. Exemplary catalyst supports include, but are not limited to, inorganic oxides, either alone or in combination, phosphated inorganic oxides, and mixtures thereof. Particularly preferred are supports selected from the group consisting of silica, silica-alumina, alumina, fluorided alumina, silated alumina, thoria, aluminophosphate, aluminum phosphate, phosphated silica, phosphated alumina, silica-titania, coprecipitated silica/titania, and mixtures thereof, fluorided/silated alumina, as well as any one or more of these supports which can contain chromium.

The presently most preferred catalyst support, because of greatest polymerization activity, is aluminophosphate, herein after also referred to as $AlPO_4$, as disclosed in U.S. Pat. No. 4,364,855 (1982), herein incorporated by reference. Generally, the P/Al molar ratio in the aluminophosphate support is within a range of about 0.2 to about 1.0 and preferably, within a range of 0.4 to 0.9 for best catalyst system productivity and activity. Preferably, an aluminophosphate support is activated prior to use. Activation of the support can occur under any ambient, at a temperature within a range of about 200° C. to about 1000° C., preferably from 400° C. to 650° C. for best catalyst system activity and productivity.

In the description herein, the terms "cogel" and "cogel hydrogel" are arbitrarily used to describe cogellation of at least two catalyst system components, such as, for example, silica and titania and/or aluminophosphate and chromium. The term "tergel" is used to describe the product resulting from gelation together of silica, titania, and chromium. Such terms are disclosed in U.S. Pat. No. 3,887,494 (1975), herein incorporated by reference. "Hydrogel" is defined as a support component containing water. "Xerogel" is a support component which has been dried and is substantially water-free.

Novel catalyst systems useful in this invention are dual component, or dual-site, inorganic oxide supported chromium catalyst systems. The first component of the catalyst system must be a chromium compound. The chromium component can be combined with a support component in any manner known in the art, such as forming a co-precipitated tergel. Alternatively, an organic solution, such as, for example, an alcohol solution, of a soluble chromium component can be added to a xerogel support component. While not wishing to be bound by theory, it is believed that use of water in this invention to impregnate a support with a chromium compound can cause collapse of the pores in the support, and therefor a decrease in catalyst system productivity. Suitable chromium compounds include, but are not limited to, chromium nitrate, chromium acetate, and chromium trioxide. Alternatively, a solution of a hydrocarbon soluble chromium component, such as tertiary butyl chromate, a diarene chromium compound, bis-cyclopentadienyl chromium(II) or chromium acetylacetonate, can be used to impregnate a xerogel support.

The chromium component can be used in any amount sufficient to provide polymerization catalytic activity. Generally, an amount sufficient to give from about 0.05 to about 5, preferably about 0.5 to about 2 weight percent chromium, based on the total weight of the chromium and support after activation, can be used.

The resulting chromium component on an inorganic oxide support then must be subjected to activation, or calcination, in an oxygen-containing ambient in any manner conventionally used in the art. Because of economy, the preferred oxygen-containing ambient is air, most preferably dry air to maintain catalyst system integrity for best catalytic activity and productivity. The activation can be carried out at an elevated temperature for about ½ to about 50 hours, preferably about 2 to about 10 hours, at a temperature within a range of about 400° to about 900° C. Under these conditions, at least a substantial portion of any chromium in a lower valence state is converted to a hexavalent form.

A preferred, second type of supported chromium-oxide catalyst system useful in this invention is prepared when the resulting, previously activated, supported catalyst system is cooled and subjected to at least a partial reduction of the hexavalent chromium to a lower valence state. Preferably, a substantial portion of the chromium will be in a divalent state after the reduction process in order to achieve better polymerization activity and productivity.

The reducing agent most preferably is carbon monoxide due to ease of use, availability and safety, based on the safety of other reducing agents. The reducing agent can be employed at temperatures between about 300° to about 500° C., although a reducing agent is more often employed at temperatures within a range of about 350° to about 450° C. The partial pressure of the reducing gas in the reduction operation can be varied from sub-atmospheric pressures to relatively high pressures, but the simplest commercial reducing operation is to utilize a dilute solution of a pure reducing agent at about atmospheric pressure. Usually, a solution of about 10%, by volume, carbon monoxide in an inert ambient, such as, for example, nitrogen and/or argon, can be used. If desired, neat reducing agent, such as, for example, undiluted carbon monoxide, can be used.

The reduction time can vary from a few minutes to several hours or more. The extent of reduction can be followed by visual inspection of catalyst system color. The color of the initial oxygen-activated catalyst system is generally orange, indicating the presence of hexavalent chromium. The color of the reduced catalyst system preferably employed in the invention is blue, indicating that all or substantially all of the initial hexavalent chromium has been reduced to lower oxidation states, generally a divalent state.

The course of the reduction action of the air-activated orange catalyst system with a reducing agent can be determined exactly by pulse titration. A known amount of reducing agent is added per pulse and the amount of evolved, oxidized reducing agent is measured. When reduction is complete, only reducing agent will be present and the catalyst system is blue in color. The blue, reduced catalyst system can be titrated with pulses of oxygen or any oxidizing agent, to convert the catalyst system back to the original orange color. When oxidation is complete, the oxidizing agent will be evident in the off-gas.

After reduction, an inert atmosphere, such as argon or nitrogen, is used to flush out the reducing agent from the reduced, supported first catalyst system component. After the flushing treatment, the first catalyst system component is cooled to about room temperature, e.g. about 25° C., and is kept under an inert atmosphere, and preferably away from contact with either a reducing agent or an oxidizing agent.

The second catalyst system component useful in this invention must be a member of the chromocene family of compounds, wherein said chromocene is unsupported. The parent compound of the chromocene family is an organometallic coordination compound, also called a metallocene. The chromocene portion of the catalyst system comprises a cyclopentadienyl (Cp) chromium compound, preferably a bis-cyclopentadienyl ($Cp_2$), chromium compound. Such compounds are considered aromatic and are depicted by a formula such as $(C_5H_5)_2Cr$ wherein a chromium atom is "sandwiched" between two cyclopentadienyl rings. Exemplary chromocenes employed in accordance with this invention are represented by the general formulae $(C_5R'm)R''s(C_5R''m)Cr$, $(C_5R''m)R''s(C_5R''m)CrQ$, and $(C_5R''m)CrQ$ wherein $(C_5R''m)$ is cyclopentadienyl or substituted cyclopentadienyl, each R' can be the same or different and is selected from hydrogen or a hydrocarbyl radical selected from alkyl, alkenyl, aryl, alkylaryl, or arylalkyl radicals having from about 1 to about 20 carbon atoms or two adjacent carbon atoms are joined together to form a $C_4$-$C_6$ ring, R" is a $C_1$-$C_4$ alkylene radical, a dialkyl germanium or silicone or alkyl phosphine amine radical bridging to $(C_5R'm)$ rings, Q is a hydrocarbon radical such as aryl, alkyl, alkenyl, alkylaryl, or arylalkyl radicals having from about 1 to about 20 carbon atoms or halogen and can be the same or different, s is 0 or 1, and m is 4 when s is 1 and m is 5 when s is 0.

The term "bis-(cyclopentadienyl)chromium(II) compound" includes not only bis-(cyclopentadienyl)-chromium(II) but substituted derivatives thereof in which the cyclopentadienyl rings contain one or more substituents which do not affect the ability of the adsorbed substituted bis-(cyclopentadienyl)chromium(II) compound to function as an ethylene polymerization catalyst. The specific bis(cyclopentadienyl)chromium(II) compound, bis-(cyclopentadienyl)chromium(II), sometimes called chromocene, has the following postulated structure:

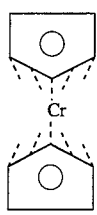

Other exemplary bis-(cyclopentadienyl) compounds include, but are not limited to, bis(fluoroenyl)chromium(II)

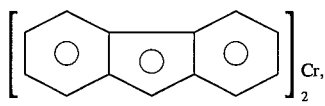

and bis-(indenyl)chromium(II),

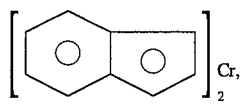

as well as bis-(cyclopentadienyl)chromium(II) compounds having substituted ligands of the formula

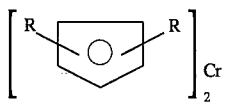

where one or both R groups are selected from 1–6 carbon atom alkyl radicals. These materials can be thought of as a divalent cation (chromium) coordinated by two negatively charged cyclopentadienyl ligands.

Bis-(cyclopentadienyl)chromium(II) compounds are solids which are soluble in many organic solvents. Preferred solvents are non-polar liquids used at ambient temperatures. Types of suitable solvents include, but are not limited to, alkanes, cycloalkanes, alkenes, and aromatic hydrocarbons. Exemplary solvents include pentane, n-hexane, heptane, decane, cyclohexane, methylcyclohexane, benzene, xylenes, and mixtures of two or more thereof. Preferably, a sufficient quantity of a solution of the chromium component is used to completely wet the aluminophosphate support and fill the porous support structure to insure even distribution of the chromium compound on the support. Generally, the chromium-containing organic solvent solution used to impregnate the support contains from about 0.002 to about 25 weight percent organochromium compound.

A sufficient volume of the solution of the organochromium compound is taken so as to provide from about 0.01 to about 10, preferably about 0.05 to about 5, more preferably from 0.1 to 2 weight percent chromium, based on the weight of the inorganic oxide supported chromium oxide. Contacting the support and organochromium solution can be effected in any conventional way, such as, for example, by slurrying, and can be at any convenient temperature. Generally, ambient temperature is used, although temperatures ranging from about the freezing point of the solvent to as high as about 300° F. can be employed during the contacting period. Any pressure can be used, although preferred pressures are those which can maintain the solvent in a liquid phase, for ease of contacting. Contact times from a few seconds to several hours are adequate. The same stoichiometric amounts of chromium and support can be used when the chromium component is added as a separate stream to the reactor and contacted with the support in-situ.

Commonly used polymerization cocatalysts can be used, if desired, but are not necessary. Exemplary cocatalysts include, but are not limited to, metal alkyl, or organometal, cocatalysts, i.e., alkyl boron and/or alkyl aluminum compounds, which can alter melt flow characteristics (melt index or high load melt index) of the resultant polymer. The term "metal" in organometal is intended to include boron. While not wishing to be bound by theory, it is believed a cocatalyst can act as a scavenger to catalyst system poisons.

If the cocatalyst is a trihydrocarbylboron compound, a trialkyl boron compound is preferred, wherein the alkyl groups have from about 1 to about 12 carbon atoms and preferably, from 2 to 5 carbon atoms per alkyl group. Trialkyl boron compounds, such as, for example, tri-n-butyl borane, tripropylborane, and triethylborane (TEB) are preferred cocatalysts because these compounds are effective agents to improve polymer properties, such as, for example, to reduce melt flow and retard polymer swelling during polymerization. Other suitable boron compounds include trihydrocarbyl boron compounds broadly; triaryl boron compounds, such as, for example, triphenylborane; boron alkoxides, such as, for example, $B(OC_2H_5)_3$; and halogenated alkyl boron compounds, such as, for example, $B(C_2H_5)Cl_2$. By far, the most preferred cocatalyst is triethylborane, for the reasons given above.

Also suitable, are aluminum compounds of the formula $AlR'nX_{3-n}$ where X is a hydride or halide, R' is a 1 to 12 carbon atom hydrocarbyl radical and n is an integer of 1 to 3. Triethylaluminum (TEA) and diethylaluminum chloride are particularly suitable.

A cocatalyst, when used, can be used in an amount within a range of about 1 to about 20 parts per million (ppm), or milligrams per kilogram (mg/kg), based on the mass of the diluent in the reactor. Preferably, the cocatalyst is used in an amount within a range of 1 to 12 mg/kg, for cost effectiveness and best resultant polymer properties. Expressed in other terms, a cocatalyst can be present in an amount so as to give an atom ratio of metal to chromium within a range of about 0.5:1 to about 10:1, preferably 2:1 to 8:1.

The cocatalyst can either be premixed with a catalyst system or added as a separate stream to the polymerization zone, the latter being preferred.

Reactants and Reaction Conditions

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle form, or slurry, process wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within a range of about 185° to about 230° F. (85° to 110° C.), although higher or lower temperatures can be used. Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium oxide catalyst system can be utilized either before or after a reactor utilizing a supported chromocene catalyst system. In another specific instance, a conventional, supported chromium oxide catalyst system can be utilized in a reactor in parallel with a reactor utilizing a supported chromocene catalyst system and the resulting polymerization products combined prior to recovering the polymer.

The molecular weight of the polymer can be controlled by various means known in the art such as adjusting the temperature (higher temperature giving lower molecular weight) and introducing, or varying the amount of, hydrogen to alter the molecular weight, or varying the catalyst compounds.

Polymer Characteristics

Polymers produced in accordance with this invention have increased density, broadened molecular weight distribution especially on the low molecular weight end, increased MI, and increased HLMI, as compared to polymers prepared in the absence of chromocene. While not wishing to be bound by theory, it is believed that polymers produced in accordance with this invention are unique in that the polymer chains are intertwined in each polymer particle; each polymer particle can be considered "all-inclusive" as to polymer characteristics. This catalyst system composition most preferably is applicable for use with ethylene polymerization.

The resultant ethylene polymer will usually have a density within a range of about 0.91 to about 0.975 g/cc, and preferably within a range of about 0.945 to about 0.96 g/cc. The polymer melt index (MI) is usually within a range of about 0.015 to about 0.7 g/10 min and preferably within a range of about 0.02 to about 0.5 g/10 min. The polymer high load melt index (HLMI) of the resultant polymer will usually be within a range of about 1 to about 175 g/10 min and preferably within a range of about 4 to about 70 g/10 min. The shear ratio (HLMI/MI) is usually within a range of about 40 to about 250, and preferably within a range of about 50 to 200. Polymers with characteristics within the given ranges are especially useful for applications of blow molding and/or film production.

EXAMPLES

The following Examples illustrate various aspects of the invention. Data are included for each example about the polymerization conditions, as well as the resultant polymer. All chemical handling, including reactions, preparation and storage, was performed under a dry, inert atmosphere (usually nitrogen). Unless otherwise indicated, bench scale polymerizations were completed in a 2 or 2.65 liter autoclave reactor at 95° C. using an isobutane (1 or 1.2 liter, respectively) slurry. Approximately 0.08 grams of conventional, supported chromium oxide catalyst system was charged to the reactor against a counter current of isobutane. If hydrogen was charged to the reactor, hydrogen addition was followed by isobutane. Isobutane was flushed into the reactor with a small amount of ethylene. Where applicable, 1-hexene was added, followed by ethylene to bring the total reactor pressure to 550 psig. In some cases, 1-hexene was charged half-way through the isobutane charge. Co-catalysts, if used, were added half-way through the isobutane charge or with the 1-hexene. Ethylene was fed on demand and polymerization reaction time usually was about 60 minutes.

Supported chromium oxide ($Cr/AlPO_4$) catalyst systems were prepared one of two ways. The first method of preparation comprised contacting dry aluminophosphate, as disclosed in U.S. Pat No. 4,364,855 (1982), having a P/Al molar ratio of 0.3, 0.6, or 0.9, with an appropriate amount of $Cr(NO_3)_3.9H_2O$ in methanol using an incipient wetness technique, i.e., such that the chromium/methanol solution just filled the pores of the support. The resulting supported chromium catalyst system composition was dried in a vacuum oven at 95° C. for 18 hours; activated by being fluidized in air at 600° C. for 3 hours; and optionally, reduced in carbon monoxide (CO) at 350° C. for 30 minutes. Catalyst systems were stored under nitrogen.

Alternatively, catalyst systems were prepared as described earlier, except that $Cr(NO_3)_3.9H_2O$ was cogelled with the aluminum and phosphorous compounds. The resulting catalyst systems were dried, activated and stored, as described earlier. Catalyst systems prepared in this manner are referred to as "cogel" or "cogelled".

Separately prepared supported chromocene catalyst systems were prepared and used according to the following procedure. A 40–70 mg portion of calcined aluminophosphate support was placed in a small filter tube and slurried with 2 mL hexane. Then, 0.8–1.4 mL of $CrCp_2$ ($Cr(C_5H_5)_2$) in hexane solution (1 mg Cr/mL) was added, and the slurry was stirred. After about 1 minute, the red-orange $CrCp_2$ solution became clear and the support turned black. The supported $CrCp_2$ slurry was filtered and washed two times with 3 mL hexane, always taking care not to let the supported $CrCp_2$ become dry. The chromocene loading on the support was about 2 wt. % in all Runs. The slurry volume was brought to 4 mL with hexane and 0.3 mL of 0.5 weight percent triethylaluminum (TEA), in hexane, was added. The slurry was drawn into a syringe, taken out of the dry box, and charged to a polymerization reactor.

Dual site catalyst systems were prepared in one of two ways. In the first method, the polymerization reactor was charged with an above-described, activated, and optionally CO reduced, $Cr/AlPO_4$ catalyst system, followed by a hydrogen charge and one-half of the isobutane charge. Then, a hexane solution of bis-cyclopentadienyl chromium ($CrCp_2$) (1 mg Cr/mL) was flushed into the reactor with the remaining isobutane charge, while stirring, to allow the $CrCp_2$ to contact the supported chromium oxide catalyst system in the reactor. If any cocatalyst was used, then a portion of the isobutane charge was saved to carry cocatalyst into the reactor. Addition of 1-hexene was followed by ethylene to bring the reactor to 550 psig.

The supports could be fluorided by dissolving the appropriate amount of ammonium bifluoride (also called ammonium hydrogen difluoride, $NH_4F.HF$) in methanol and contacting it with the support using incipient wetness technique. The support was then dried in a vacuum oven at 95° C. for 18 hours. The fluoride could be added prior to or after the $Cr(NO_3)_3.9H_2O$. The catalyst was then activated as described above.

Alternatively, dual site catalyst systems were prepared by contacting an above-described, activated, and optionally reduced, $Cr/AlPO_4$ catalyst system with a hexane solution of cyclopentadienyl chromium ($CrCp_2$) under a dry, inert atmosphere, followed by washing with hexane to remove any excess cyclopentadienyl ligand.

After polymerization, polyethylene fluff was stabilized, dried at 50° C. under vacuum, and melt blended in a midget Banbury mixer or extruded on a Braebender twin screw extruder. Recovered polymers which had very high or very low high low melt indices (HLMI) were not melt blended.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 min) was determined in accordance with ASTM D1238 at 190° C. with a 21,600 gram weight. Melt index (MI, g/10 min) was determined in accordance with ASTM D1238 at 190° C. with a 2,160 gram weight. Environmental Stress Crack Resistance (ESCR, hrs) was determined according to ASTM D1693, Conditions A and/or C. Flexural modulus (Flex Mod, Kpsi) was determined in accordance with ASTM D790, 2 inch span, 1 mm/sec crosshead speed. Size exclusion chromatography (SEC) analyses were performed at 140° C. on a Waters, model 150 GPC with a refractive index detector. A solution concentration of 0.25 weight percent in 1,2,4-trichlorobenzene was found to give reasonable elution times. Smoke measurements were made as described in U.S. Pat. No. 5,110,214, herein incorporated by reference.

Polymers (resins) were fractionated in accordance with the following procedure. A 6.0 g portion of the resin was dissolved in a solution of 75 volume % 1,2,4-trimethylbenzene (TMB) and 25 volume % butylcellosolve (BCS) at 130° C. This solution was gravity ted into a column of very fine glass beads and cooled to room temperature. Next, BCS was pumped into the column and a room temperature solubles (effluent) fraction was taken as 75% TMB (by volume) was removed from the column. With BCS in the column, the temperature was raised to 110° C. and another fraction was collected; 12% TMB and 88% (by volume) BCS was pumped into the column, the temperature was raised again to 130° C. and another fraction was collected. The column was allowed to equilibrate overnight. The fraction and collection process was repeated, each time increasing the TMB concentration, until no more polymer could be extracted off the column. The column temperature was raised to 140° C. to remove the last polymer fraction. Resins were recovered by precipitating each polymer fraction into acetone which was twice the polymer fraction volume. The precipitated resins were filtered and dried at 80° C. in a vacuum oven. Dried resins were analyzed by GPC and $^{13}C$ NMR.

Solution $^{13}C$ NMR spectra were collected from a deuterated trichlorobenzene solution using either a GE QE200 NMR at 75.5 MHz, or a Varian 500 NMR at 125.7 MHz.

Example 1

Data given below in Table 1 compares oxidized and reduced forms of supported chromium polymerization catalyst systems wherein comonomer has or has not been added.

In all Runs, the catalyst system had a two (2) weight percent chromium loading, 1.2 liters of isobutane were added, reactor temperature was 95° C. and 35 psi hydrogen was added. All Runs were for 60 minutes, except Run 104, which was for 40 minutes; Run 110, which was for 45 minutes and Run 112, which was for 50 minutes. As can be seen from the resultant polymer density, a polymer prepared using only a CO reduced, supported chromium oxide catalyst system has a lower density and, therefore, is considered to be more efficient in incorporating 1-hexene into the polymer. Alternatively, catalyst systems which have not been CO reduced result in polymers which have higher density values and greater HLMI values.

TABLE 1

| Run | P/Al, Molar Ratio | 1-C$_6$, mL | Catalyst Treatment[a] | Productivity, g pol/g cat | HLMI, g/10 min | Density, g/cc |
|---|---|---|---|---|---|---|
| 101 | 0.3 | 0 | Ox | 2560 | 3.71 | 0.959 |
| 102 | 0.3 | 0 | Red | 3980 | 0.60 | 0.955 |
| 103 | 0.3 | 20 | Ox | 1760 | 27.0 | 0.953 |
| 104 | 0.3 | 20 | Red | 4850 | 2.27 | 0.945 |
| 105 | 0.6 | 0 | Ox | 1980 | 6.62 | 0.961 |
| 106 | 0.6 | 0 | Red | 4590 | 2.20 | 0.958 |
| 107 | 0.6 | 20 | Ox | 1350 | 80.4 | 0.957 |
| 108 | 0.6 | 20 | Red | 5880 | 6.66 | 0.950 |
| 109 | 0.9 | 0 | Ox | 2000 | 7.15 | 0.962 |
| 110 | 0.9 | 0 | Red | 2250 | 4.06 | 0.960 |
| 111[b] | 0.9 | 20 | Ox | 1800 | 154 | 0.957 |
| 112 | 0.9 | 20 | Red | 4160 | 14.6 | 0.950 |

[a] Ox = oxidized only, Red = oxidized and CO reduced.
[b] 2.5 mg/kg triethylaluminum (TEA) was added.

Example 2

Data for polymerization reactions wherein CrCp$_2$ was adsorbed onto a supported chromium oxide catalyst system are given in Table 2. The P/Al molar ratios of the supports were varied. In all Runs, reactor temperature was 95° C. and 35 psi hydrogen was added. All Runs were for 60 minutes, except Run 201, which was for minutes; Run 210, which was for 45 minutes; Run 211, which was for 43 minutes; and Run 212, which was for 35 minutes. As can be seen from the data in Table 2, the effect of addition of CrCp$_2$ onto a supported chromium oxide catalyst system is more pronounced when a CO reduced chromium oxide catalyst system is used than when an oxidized-only supported chromium catalyst system is used.

TABLE 2

| Run | P/Al Molar Ratio | CrCp$_2$ wt % | Catalyst Treatment[a] | Other Components[b] | MI, g/10 min | HLMI, g/10 min | Den, g/cc | Productivity, g pol/g cat |
|---|---|---|---|---|---|---|---|---|
| 201 | 0.3 | 0 | Ox | 2.8 | 0.04 | 4.5 | 0.958 | 3180 |
| 202 | 0.3 | 0 | Red | 2.8 | 0 | 2.38 | 0.954 | 4050 |
| 203 | 0.3 | 0.31 | Ox | 2.8 | 0.02 | 5.17 | 0.959 | 2740 |
| 204 | 0.3 | 0.28 | Red | 2.8 | 0.86 | 85.2 | 0.963 | 1400 |
| 205 | 0.6 | 0 | Ox | — | 0.03 | 6.62 | 0.961 | 1980 |
| 206 | 0.6 | 0 | Red | 20 | 0.04 | 6.66 | 0.950 | 5880 |
| 207 | 0.6 | 0.29 | Ox | — | 0.02 | 4.97 | 0.962 | 1160 |
| 208 | 0.6 | 0.26 | Red | 20 | 0.54 | 64.8 | 0.958 | 2520 |
| 209 | 0.9 | 0 | Ox | — | 0.03 | 7.15 | 0.962 | 2000 |
| 210 | 0.9 | 0 | Red | — | 0.01 | 4.06 | 0.960 | 2250 |
| 211 | 0.9 | 0.36 | Ox | Method 2[c] | 7.35 | 234 | 0.963 | 800 |

TABLE 2-continued

| Run | P/Al Molar Ratio | CrCp$_2$ wt % | Catalyst Treatment[a] | Other Components[b] | MI, g/10 min | HLMI, g/10 min | Den, g/cc | Productivity, g pol/g cat |
|---|---|---|---|---|---|---|---|---|
| 212 | 0.9 | 0.35 | Red | — | 3.6 | 167 | 0.965 | 1890 |

[a]Ox = oxidized only; Red = oxidized and CO reduced.
[b]Runs 201–204 had triethylaluminum (TEA) added, given in mg/kg (ppm); Runs 206 and 208 had 1-hexene added, given in mL.
[c]Refers to the method of preparation of the supported chromium oxide catalyst system.

Example 3

The data in Table 3 show the effect of the molar ratio of phosphorous to aluminum on catalyst system productivity. In all Runs, 35 psig hydrogen were added to the reactor and the reaction time was 60 minutes. No 1-hexene was added in Runs 301 and 303 and 20 mL 1-hexene was added to the reactor in Run 302. Polymer produced in Run 303 was blended in a Banbury mixer prior to analysis.

TABLE 3

| Run | P/Al Molar Ratio | CrCP$_2$, Wt % | Productivity, g pol/g cat | MI, g/10 min | HLMI, g/10 min | Den, g/cc |
|---|---|---|---|---|---|---|
| 301 | 0.3 | 0.28 | 1400 | 0.86 | 85.2 | 0.963 |
| 302 | 0.6 | 0.26 | 2520 | 0.54 | 64.8 | 0.958 |
| 303 | 0.9 | 0.19 | 2680 | 0.18 | 16 | 0.961 |

Example 4

The data in Example 4 show the effect of fluoriding the support. In all Runs, 35 psig hydrogen and 20 mL of 1-hexene were added to the reactor. Run 406 had 2.8 mg/kg (ppm) TEA added to the reactor. Run 402 was blended in a Banbury mixer; Runs 404, 405 and 406 were blended in a Braebender extruder.

TABLE 4

| Run | P/Al Molar Ratio | F,[a] wt % | CrCp$_2$, wt % | Productivity, g pol/g cat | MI, g/10 min | HLMI, g/10 min | Den, g/cc |
|---|---|---|---|---|---|---|---|
| 401 | 0.3 | — | 0.26 | 1490 | 0.13 | 19 | — |
| 402 | 0.3 | 1 | 0.31 | 2270 | 0.29 | 55 | 0.958 |
| 403 | 0.3 | 2 | 0.30 | 1790 | 0.18 | 26 | — |
| 404 | 0.6 | — | 0.26 | 2380 | 0.20 | 22 | 0.952 |
| 405 | 0.6 | 1 | 0.26 | 1160 | 0.22 | 24 | 0.955 |
| 406[b] | 0.6 | 1 | 0.25 | 2120 | 0.97 | 87 | 0.959 |

[a]Based on total weight of support only.
[b]TEA, 2.8 mg/kg, added to reactor.

Example 5

The data in Table 5 show the effect of using a cogel as the support for the dual site catalyst system and that the productivity is significantly lowered. In all Runs, reactor temperature was 95° C. and 35 psig hydrogen and 20 mL 1-hexene were added to the reactor. All chromium oxide catalyst systems were Co reduced prior to the addition of CrCp$_2$. Run time in all Runs was 60 minutes, except Run 506 which was for 40 minutes. Polymer produced in Run 501 was blended in Banbury mixer. Runs 502, 503, 504, and 506 used a cogel catalyst system support.

TABLE 5

| Run | P/Al Molar Ratio | CrCp$_2$, Wt % | Productivity, g pol/g cat | MI, g/10 min | HLMI, g/10 min | Den, g/cc |
|---|---|---|---|---|---|---|
| 501 | 0.6 | 0.26 | 2520 | 0.54 | 65 | 0.958 |
| 502 | 0.6 | 0.09 | 2080 | 0.04 | 7.5 | — |
| 503 | 0.6 | 0.19 | 780 | — | 155 | — |
| 504 | 0.6 | 0.26 | 800 | 18 | 807 | — |
| 505 | 0.3 | 0.26 | 1490 | 0.13 | 19 | — |
| 506 | 0.3 | 0.21 | 460 | — | 95 | — |

Example 6

The data in Table 6 show the amount of smoke generated from both the "multicomponent" resins and resins produced from the reduced Cr/AlPO$_4$ catalyst alone. Runs 603 and 606 had one (1) weight percent fluoride added to the support. In all Runs, 35 psig hydrogen were added to the reactor. In all Runs, 20 mL 1-hexene was added to the reactor. Run 601 had 10 mL 1-hexene and 2 ppm TEB added to the reactor. All run times were 60 minutes, except Run 602, which was for 40 minutes. Runs 601 and 604 were blended in a Banbury mixer, Run 605 was blended in a Braebender extruder and Run 606 was blended in an extruder. The data show that Runs using a dual catalyst system can produce polymers with lower smoke values than polymers produced using a CO reduced Cr/AlPO$_4$ catalyst system alone.

TABLE 6

| Run | P/Al Molar Ratio | CrCp$_2$, Wt % | Productivity, g pol/g cat | MI, g/10 min | HLMI, g/10 min | Den, g/cc | Smoke, Mg/m$^3$ |
|---|---|---|---|---|---|---|---|
| 601 | 0.6 | — | 4340 | 0.14 | 25 | 0.958 | >2100 |
| 602 | 0.6 | — | 2570 | 0.11 | 19 | 0.946 | >2100 |
| 603 | 0.6 | — | 3730 | 0.08 | 12 | 0.948 | >2100 |
| 604 | 0.6 | 0.26 | 2520 | 0.54 | 65 | 0.958 | 1090 |
| 605 | 0.6 | 0.26 | 2380 | 0.20 | 22 | 0.952 | 1600 |
| 606 | 0.6 | 0.25 | 2120 | 0.97 | 87 | 0.959 | 980 |

Example 7

The data in Tables 7 and 8 show the chromocene is an active component on a reduced Cr/AlPO$_4$ catalyst. All Runs were at 95° C. and had 35 psig hydrogen added to the reactor. Aluminophosphate supports in Runs 701 and 702 were calcined at 450° C. and in Run 703 at 600° C. Chromocene is known to produce methyl branches on the polymer back bone. The amount of methyl groups found as well as the amount of comonomer in resins produced from only chromocene adsorbed onto various aluminophosphate supports are listed below in Table 7.

TABLE 7

| Run | P/Al | 1-hexene mL | MI | Density g/mL | #CH$_3$ Branches/ 1000 C. | #C$_4$H$_8$ Branches/ 1000 C. |
|-----|------|-------------|-----|--------------|---------------------------|-------------------------------|
| 701 | 0.3  | 40          | 114 | 0.9669       | 2.1                       | 0                             |
| 702 | 0.6  | 30          | 65  | —            | 2.7                       | 0                             |
| 703 | 0.9  | 30          | 141 | —            | 1.7                       | 0                             |

Table 8a gives the results of two polymers which were fractionated to determine the location of the short chain branches (SCBs) in the polymer. All runs were at 95° C. using 35 psi hydrogen and the corresponding amount of 1-hexene. The number of branches were determined by $^{13}$C NMR. Polymer produced in Run 801 was extruded with a Maxwell mini-extruder prior to analysis. Polymer in Run 802 was mixed in a Banbury mixer prior to analysis.

TABLE 8a

| Run | P/Al Molar Ratio | CrCp$_2$, Wt % | MI, g/10 min | HLMI, g/10 min | Density g/mL |
|-----|------------------|-----------------|--------------|----------------|--------------|
| 801 | 0.6              | 0               | 0.07         | 11.67          | 0.949        |
| 802 | 0.6              | 0.3             | 0.54         | 64.77          | 0.959        |

Table 8b contains data pertaining to the fractionation of a multicomponent resin made with chromocene adsorbed onto a reduced Cr/AlPO$_4$ catalyst and the reduced Cr/AlPO$_4$ catalyst by itself. Resin 801 and 802 were prepared as described in Table 8a. The amount of methyl branching can be found under the mol % C$_3$; it can be viewed that a methyl branch is a result of a propylene monomer unit. The amount of ethyl branching can be found under the mol % C$_4$; the amount of butyl branching can be found under the mol % C$_6$. The data in Table 8b show that chromocene is an active component of the catalyst system, based on the presence of methyl branches. The data also show that the CO-reduced portion of the catalyst system is active, based on the presence of butyl branches (as a result of incorporating 1-hexene). Furthermore, while not wishing to be bound by theory, it is believed that chromocene is the active component in production of the low molecular weight portion of the material.

TABLE 8b

| Run | No. | M$_w$-3$\times$10 | IB | wt. % | mol % C$_6$ | mol % C$_4$ | mol % C$_3$ |
|-----|-----|-------------------|-----|-------|-------------|-------------|-------------|
| 801 | parent | 225.84 | 1.650 | 100 | 0.305 | 0.07 | 0.02 |
| (fraction) | 1 | 1.34 | 0.308 | 1.46 | 0.614 | 0.27 | 0.01 |
|     | 2 | 2.46 | 0.373 | 2.98 | 0.480 | 0.137 | 0.01 |
|     | 3 | 4.69 | 0.474 | 8.04 | 0.202 | 0.061 | 0.02 |
|     | 4 | 8.11 | 0.313 | 3.94 | 0.324 | 0.072 | 0.01 |
|     | 5 | 74.99 | 1.236 | 62.47 | 0.376 | 0.034 | 0.02 |
|     | 6 | 745.28 | 0.793 | 15.55 | 0.220 | 0.026 | 0.01 |
|     | 7 | 2535.43 | 0.913 | 3.87 | a | a | a |
| 802 | parent | 201.90 | 1.621 | 100 | 0.163 | 0.027 | 0.13 |
| (fraction) | 1 | 1.34 | 0.316 | 1.40 | 0.518 | 0.233 | 0.45 |
|     | 2 | 2.22 | 0.363 | 2.82 | 0.320 | 0.104 | 0.28 |
|     | 3 | 4.59 | 0.486 | 10.62 | 0.109 | 0.041 | 0.124 |
|     | 4 | 7.67 | 0.329 | 5.62 | 0.164 | 0.025 | 0.132 |
|     | 5 | 64.52 | 1.105 | 66.31 | 0.183 | 0.024 | 0.145 |
|     | 6 | 1041.10 | 0.894 | 10.31 | 0.166 | 0.012 | 0 |
|     | 7 | 3074.00 | 0.899 | 1.80 | a | a | a | a These samples were only sparingly soluble, therefore a good NMR spectrum could not be obtained.

While this invention has been described in detail for the purpose of illustration, it is not to be construed as limited thereby but is intended to cover all changes and modifications within the spirit and scope thereof.

That which is claimed is:

1. A dual site catalyst composition comprising:
    a) a chromium oxide catalyst system comprising chromium oxide supported on an inorganic oxide support prepared from an inorganic oxide support impregnated with a chromium compound and activated in the presence of oxygen and reduced in the presence of a reducing agent; and
    b) a chromocene compound.

2. A composition according to claim 1 wherein said inorganic oxide support is selected from the group consisting of silica, silica-alumina, alumina, fluorided alumina, silated alumina, thoria, aluminophosphate, aluminum phosphate, phosphated silica, phosphated alumina, silica-titania, coprecipitated silica-titania, and mixtures thereof, fluorided and silated alumina, and mixtures of two or more thereof.

3. A composition according to claim 2 wherein said inorganic oxide support is aluminophosphate with a phosphorus to aluminum molar ratio within a range of about 0.2 to about 1.0.

4. A composition according to claim 1 wherein said chromocene compound has a general formula selected from the group consisting of (C$_5$R'm)R''s(C$_5$R'm)Cr, (C$_5$R'm)R''s(C$_5$R'm)CrQ, and (C$_5$'m)CrQ;

wherein (C$_5$'m) is cyclopentadienyl or substituted cyclopentadienyl, each R' can be the same or different and is selected from the group consisting of hydrogen and a hydrocarbyl radical which is selected from alkyl, alkenyl, aryl, alkylaryl, or arylalkyl radicals having from about 1 to about 20 carbon atoms and two adjacent carbon atoms can be joined together to form a C$_4$–C$_6$ ring; R'' is a selected from the group consisting of a C$_1$–C$_4$ alkylene radical, a dialkyl germanium or silicone or alkyl phosphine amine radical bridging two (C$_5$R'm) rings; Q is a hydrocarbon radical selected from the group consisting of aryl, alkyl, alkenyl, alkylaryl, or arylalkyl radicals having from about 1 to about 20 carbon atoms or halogen and can be the same or different; s is 0 or 1; and m is 4 when s is 1 and m is 5 when s is 0.

5. A composition according to claim 4 wherein said chromocene compound is a bis-(cyclopentadienyl) chromium(II) compound.

6. A composition according to claim 1 further comprising a metal alkyl.

7. A composition according to claim 6 wherein said metal alkyl is selected from the group consisting of alkyl boron compounds, alkyl aluminum compounds, and mixtures thereof.

8. A composition according to claim 7 wherein said metal alkyl is an alkyl boron compound.

9. A composition according to claim 7 wherein said metal alkyl is an alkyl aluminum compound.

10. A composition according to claim 1 wherein said chromium is present in said chromium oxide catalyst system in an amount within a range of about 0.05 to about 5 weight percent chromium, based on the total weight of chromium and support after activation.

11. A composition according to claim 1 wherein said chromium oxide catalyst system has been activated in an oxygen-containing ambient at a temperature within a range of about 400° to about 900° C. for a time in the range of about ½ to about 50 hours.

12. A composition according to claim 1 wherein at least a portion of any chromium in the chromium oxide catalyst system is converted to a hexavalent form in any manner conventionally used in the art.

13. A composition according to claim 12 wherein said chromium oxide catalyst system is subjected to at least a partial reduction of the hexavalent chromium to a lower valent state.

14. A composition according to claim 12 wherein said chromium oxide catalyst system is subjected to treatment with carbon monoxide at a temperature within a range of about 300° to about 500° C.

* * * * *